US008875976B2

(12) United States Patent
Schultz et al.

(10) Patent No.: US 8,875,976 B2
(45) Date of Patent: Nov. 4, 2014

(54) SYSTEM FOR CONTINUOUS FEEDING OF FILLER MATERIAL FOR FRICTION STIR WELDING, PROCESSING AND FABRICATION

(75) Inventors: Jeffrey Patrick Schultz, Blacksburg, VA (US); Kevin Creehan, Blacksburg, VA (US)

(73) Assignee: Aeroprobe Corporation, Christiansburg, VA (US)

( * ) Notice: Subject to any disclaimer, the term of this patent is extended or adjusted under 35 U.S.C. 154(b) by 61 days.

(21) Appl. No.: 13/442,201

(22) Filed: Apr. 9, 2012

(65) Prior Publication Data

US 2012/0279441 A1 Nov. 8, 2012

Related U.S. Application Data

(63) Continuation-in-part of application No. 12/792,655, filed on Jun. 2, 2010, now Pat. No. 8,636,194, which is a continuation-in-part of application No. 11/527,149, filed on Sep. 26, 2006, now abandoned, and a continuation-in-part of application No. 12/987,588, filed on Jan. 10, 2011, now Pat. No. 8,632,850.

(60) Provisional application No. 60/720,521, filed on Sep. 26, 2005, provisional application No. 61/293,543, filed on Jan. 8, 2010, provisional application No. 61/472,918, filed on Apr. 7, 2011, provisional application No. 61/473,221, filed on Apr. 8, 2011.

(51) Int. Cl.
*B23K 20/12* (2006.01)
(52) U.S. Cl.
USPC .......................................... 228/2.1; 228/112.1
(58) Field of Classification Search
USPC ......... 164/2.1, 112.1, 113, 312, 900; 228/2.1, 228/112.1; 156/73.5
See application file for complete search history.

(56) References Cited

U.S. PATENT DOCUMENTS 3,217,957 A 11/1965 Jarvie et al.
3,279,971 A 10/1966 Gardener
(Continued)

FOREIGN PATENT DOCUMENTS

EP 0453182 A 10/1991
EP 0458774 A 11/1991
(Continued)

OTHER PUBLICATIONS

Berbon et al., Friction stir processing: a tool to homogenize nanocomposite aluminum alloys, Scripta Materialia, vol. 44, No. 1, pp. 61-66, Jan. 5, 2001.

(Continued)

*Primary Examiner* — Keith Walker
*Assistant Examiner* — Kevin E Yoon
(74) *Attorney, Agent, or Firm* — New River Valley IP Law, PC; Michele L. Mayberry

(57) ABSTRACT

The present invention relates to tools and methods for disposing, coating, repairing, or otherwise modifying the surface of a metal substrate using frictional heating and compressive/shear loading of a consumable metal against the substrate. Embodiments of the invention include friction-based fabrication tooling comprising a non-consumable member with a throat and a consumable member disposed in the throat, wherein consumable filler material is capable of being introduced to the throat in a continuous manner during deposition using frictional heating and compressive/shear loading of the filler material onto the substrate. Preferred embodiments according to the invention include such tools operably configured for applying a force or displacement to the filler material during deposition. Especially preferred embodiments can include using various powder-type consumable materials or combinations during the deposition process to obtain a continuous compositional gradient in the filler material yielding a functionally graded coating on the substrate.

18 Claims, 6 Drawing Sheets

(56) References Cited

U.S. PATENT DOCUMENTS

| | | | |
|---|---|---|---|
| 3,292,838 A | 12/1966 | Farley | |
| 3,418,196 A | 12/1968 | Luc | |
| 3,444,611 A | 5/1969 | Bogart | |
| 3,455,015 A | 7/1969 | Daniels et al. | |
| 3,466,737 A | 9/1969 | Hanink | |
| 3,495,321 A | 2/1970 | Shaff | |
| 3,537,172 A | 11/1970 | Voznesensky et al. | |
| 3,831,262 A | 8/1974 | Luc | |
| 3,899,377 A | 8/1975 | Luc | |
| 3,949,896 A | 4/1976 | Luc | |
| 4,106,167 A | 8/1978 | Luc | |
| 4,144,110 A | 3/1979 | Luc | |
| 4,491,001 A | 1/1985 | Yoshida et al. | |
| 4,625,095 A * | 11/1986 | Das | 219/137 WM |
| 4,824,295 A * | 4/1989 | Sharpless | 406/109 |
| 4,930,675 A | 6/1990 | Bedford et al. | |
| 4,959,241 A | 9/1990 | Thomas et al. | |
| 5,056,971 A | 10/1991 | Sartori | |
| 5,249,778 A | 10/1993 | Steichert et al. | |
| 5,262,123 A | 11/1993 | Thomas et al. | |
| 5,330,160 A | 7/1994 | Eisermann et al. | |
| 5,460,317 A | 10/1995 | Thomas et al. | |
| 5,469,617 A | 11/1995 | Thomas et al. | |
| 5,611,479 A | 3/1997 | Rosen | |
| 5,637,836 A | 6/1997 | Nakagawa et al. | |
| 5,697,511 A | 12/1997 | Bampton | |
| 5,697,544 A | 12/1997 | Wykes | |
| 5,713,507 A | 2/1998 | Holt et al. | |
| 5,718,366 A | 2/1998 | Colligan | |
| 5,769,306 A | 6/1998 | Colligan | |
| 5,794,835 A | 8/1998 | Colligan et al. | |
| 5,813,592 A | 9/1998 | Midling et al. | |
| 5,826,664 A | 10/1998 | Richardson | |
| 5,893,507 A | 4/1999 | Ding et al. | |
| 5,971,247 A | 10/1999 | Gentry | |
| 5,971,252 A | 10/1999 | Rosen et al. | |
| 5,975,406 A | 11/1999 | Mahoney et al. | |
| 6,029,879 A | 2/2000 | Cocks | |
| 6,045,027 A | 4/2000 | Rosen et al. | |
| 6,045,028 A | 4/2000 | Martin et al. | |
| 6,050,474 A | 4/2000 | Aota et al. | |
| 6,050,475 A | 4/2000 | Kinton et al. | |
| 6,051,325 A | 4/2000 | Talwar et al. | |
| 6,053,391 A | 4/2000 | Heideman et al. | |
| 6,070,784 A | 6/2000 | Holt et al. | |
| 6,119,624 A | 9/2000 | Morikawa et al. | |
| 6,138,895 A | 10/2000 | Oelgoetz et al. | |
| 6,168,066 B1 | 1/2001 | Arbegast | |
| 6,173,880 B1 | 1/2001 | Ding et al. | |
| 6,193,137 B1 | 2/2001 | Ezumi et al. | |
| 6,199,745 B1 | 3/2001 | Campbell et al. | |
| 6,206,268 B1 | 3/2001 | Mahoney | |
| 6,213,379 B1 | 4/2001 | Takeshita et al. | |
| 6,227,430 B1 | 5/2001 | Rosen et al. | |
| 6,230,957 B1 | 5/2001 | Arbegast et al. | |
| 6,237,829 B1 | 5/2001 | Aota et al. | |
| 6,237,835 B1 | 5/2001 | Litwinski et al. | |
| 6,247,633 B1 | 6/2001 | White et al. | |
| 6,247,634 B1 | 6/2001 | Whitehouse | |
| 6,250,037 B1 | 6/2001 | Ezumi et al. | |
| 6,257,479 B1 | 7/2001 | Litwinski et al. | |
| 6,259,052 B1 | 7/2001 | Ding et al. | |
| 6,264,088 B1 | 7/2001 | Larsson | |
| 6,273,323 B1 | 8/2001 | Ezumi et al. | |
| 6,276,591 B1 | 8/2001 | Kawasaki et al. | |
| 6,290,117 B1 | 9/2001 | Kawasaki et al. | |
| 6,299,048 B1 | 10/2001 | Larsson | |
| 6,299,050 B1 | 10/2001 | Okamura et al. | |
| 6,302,315 B1 | 10/2001 | Thompson | |
| 6,305,866 B1 | 10/2001 | Aota et al. | |
| 6,311,889 B1 | 11/2001 | Ezumi et al. | |
| 6,315,187 B1 | 11/2001 | Satou et al. | |
| 6,321,975 B1 | 11/2001 | Kawasaki et al. | |
| 6,325,273 B1 | 12/2001 | Boon et al. | |
| 6,328,261 B1 | 12/2001 | Wollaston et al. | |
| 6,352,193 B1 | 3/2002 | Bellino et al. | |
| 6,354,483 B1 | 3/2002 | Ezumi et al. | |
| 6,360,937 B1 | 3/2002 | De Koning | |
| 6,364,197 B1 | 4/2002 | Oelgoetz et al. | |
| 6,367,681 B1 | 4/2002 | Waldron et al. | |
| 6,378,254 B1 | 4/2002 | Gould | |
| 6,378,264 B1 | 4/2002 | Kawasaki et al. | |
| 6,382,498 B2 | 5/2002 | Aota et al. | |
| 6,386,425 B2 | 5/2002 | Kawasaki et al. | |
| 6,398,883 B1 | 6/2002 | Forrest et al. | |
| 6,413,610 B1 | 7/2002 | Nakamura et al. | |
| 6,419,142 B1 | 7/2002 | Larsson | |
| 6,419,144 B2 | 7/2002 | Aota | |
| 6,421,578 B1 | 7/2002 | Adams et al. | |
| 6,422,449 B1 | 7/2002 | Ezumi et al. | |
| 6,450,394 B1 | 9/2002 | Wollaston et al. | |
| 6,457,629 B1 | 10/2002 | White | |
| 6,460,752 B1 | 10/2002 | Waldron et al. | |
| 6,461,072 B2 | 10/2002 | Kawasaki et al. | |
| 6,464,127 B2 | 10/2002 | Litwinski et al. | |
| 6,471,112 B2 | 10/2002 | Satou et al. | |
| 6,474,533 B1 | 11/2002 | Ezumi et al. | |
| 6,484,924 B1 | 11/2002 | Forrest | |
| 6,494,011 B2 | 12/2002 | Ezumi et al. | |
| 6,497,355 B1 | 12/2002 | Ding et al. | |
| 6,499,649 B2 | 12/2002 | Sayama et al. | |
| 6,502,739 B2 | 1/2003 | Ezumi et al. | |
| 6,513,698 B2 | 2/2003 | Ezumi et al. | |
| 6,516,992 B1 | 2/2003 | Colligan | |
| 6,527,470 B2 | 3/2003 | Ezumi et al. | |
| 6,543,671 B2 | 4/2003 | Hatten et al. | |
| 6,572,007 B1 | 6/2003 | Stevenson et al. | |
| 6,582,832 B2 | 6/2003 | Kawasaki et al. | |
| 6,599,641 B1 | 7/2003 | Nakamura et al. | |
| 6,648,206 B2 | 11/2003 | Nelson et al. | |
| 6,669,075 B2 | 12/2003 | Colligan | |
| 6,722,556 B2 | 4/2004 | Schilling et al. | |
| 6,732,901 B2 | 5/2004 | Nelson et al. | |
| 6,745,929 B1 | 6/2004 | Ezumi et al. | |
| 6,758,382 B1 * | 7/2004 | Carter | 228/2.1 |
| 6,779,704 B2 | 8/2004 | Nelson et al. | |
| 6,866,181 B2 | 3/2005 | Aota et al. | |
| 6,953,140 B2 | 10/2005 | Park et al. | |
| 7,036,708 B2 | 5/2006 | Park et al. | |
| 7,066,375 B2 | 6/2006 | Bolser | |
| 7,124,929 B2 | 10/2006 | Nelson et al. | |
| 7,152,776 B2 | 12/2006 | Nelson et al. | |
| 7,156,276 B2 | 1/2007 | Slattery | |
| 7,163,136 B2 | 1/2007 | Hempstead | |
| 7,240,821 B2 | 7/2007 | Talwar | |
| 7,597,236 B2 | 10/2009 | Tolle et al. | |
| 7,608,296 B2 | 10/2009 | Packer et al. | |
| 7,624,910 B2 | 12/2009 | Barnes et al. | |
| 7,661,572 B2 | 2/2010 | Nelson et al. | |
| 8,061,579 B2 | 11/2011 | Feng et al. | |
| 8,397,974 B2 | 3/2013 | Schultz et al. | |
| 8,632,850 B2 | 1/2014 | Schultz et al. | |
| 8,636,194 B2 | 1/2014 | Schultz et al. | |
| 2002/0011509 A1 | 1/2002 | Nelson et al. | |
| 2002/0014516 A1 | 2/2002 | Nelson et al. | |
| 2002/0168466 A1 | 11/2002 | Tapphorn et al. | |
| 2002/0179682 A1 | 12/2002 | Schilling et al. | |
| 2003/0010805 A1 | 1/2003 | Nelson et al. | |
| 2003/0042292 A1 * | 3/2003 | Hatten et al. | 228/112.1 |
| 2003/0075584 A1 | 4/2003 | Sarik et al. | |
| 2004/0003911 A1 * | 1/2004 | Vining et al. | 164/312 |
| 2004/0118899 A1 | 6/2004 | Aota et al. | |
| 2004/0134972 A1 | 7/2004 | Nelson et al. | |
| 2004/0155093 A1 | 8/2004 | Nelson et al. | |
| 2004/0265503 A1 | 12/2004 | Clayton et al. | |
| 2005/0006439 A1 | 1/2005 | Packer et al. | |
| 2005/0045695 A1 | 3/2005 | Subramanian et al. | |
| 2005/0051599 A1 | 3/2005 | Park et al. | |
| 2005/0060888 A1 | 3/2005 | Park et al. | |
| 2005/0127139 A1 | 6/2005 | Slattery et al. | |
| 2005/0210820 A1 | 9/2005 | Tanaka et al. | |
| 2005/0242158 A1 | 11/2005 | Bolser | |
| 2006/0016854 A1 | 1/2006 | Slattery | |
| 2006/0060635 A1 | 3/2006 | Slattery et al. | |

(56) References Cited

U.S. PATENT DOCUMENTS

| | | |
|---|---|---|
| 2006/0096740 A1 | 5/2006 | Zheng |
| 2006/0208034 A1 | 9/2006 | Packer et al. |
| 2007/0040006 A1 | 2/2007 | Charles et al. |
| 2007/0075121 A1 | 4/2007 | Slattery |
| 2007/0102492 A1 | 5/2007 | Nelson et al. |
| 2007/0138236 A1 | 6/2007 | Agarwal et al. |
| 2007/0187465 A1 | 8/2007 | Eyre et al. |
| 2007/0241164 A1 | 10/2007 | Barnes et al. |
| 2007/0295781 A1 | 12/2007 | Hunt et al. |
| 2007/0297935 A1 | 12/2007 | Langan et al. |
| 2008/0041921 A1 | 2/2008 | Creehan et al. |
| 2009/0188101 A1 | 7/2009 | Durandet et al. |
| 2009/0236403 A1 | 9/2009 | Feng et al. |
| 2009/0258232 A1 | 10/2009 | Brice |
| 2010/0089976 A1 | 4/2010 | Szymanski et al. |
| 2010/0089977 A1 | 4/2010 | Chen et al. |
| 2010/0146866 A1 | 6/2010 | Nelson et al. |
| 2010/0258612 A1 | 10/2010 | Kolbeck et al. |
| 2010/0285207 A1 | 11/2010 | Creehan et al. |
| 2012/0009339 A1 | 1/2012 | Creehan et al. |
| 2012/0279441 A1 | 11/2012 | Creehan et al. |
| 2012/0279442 A1 | 11/2012 | Creehan et al. |
| 2012/0325894 A1 | 12/2012 | Chun et al. |

FOREIGN PATENT DOCUMENTS

| | | | |
|---|---|---|---|
| EP | 0458774 | A1 | 11/1991 |
| EP | 0410104 | B1 | 7/1993 |
| EP | 0597335 | A | 5/1994 |
| EP | 0597335 | A1 | 5/1994 |
| GB | 572789 | A | 10/1945 |
| GB | 1224891 | A | 3/1971 |
| GB | 2270864 | A | 3/1994 |
| GB | 2306366 | A | 5/1997 |
| JP | 11267857 | A | 10/1999 |
| SU | 1393566 | | 5/1988 |
| WO | 9310935 | | 6/1993 |
| WO | 2013002869 | A | 1/2013 |

OTHER PUBLICATIONS

Friction Stir Tooling: Tool Materials and Designs, Chapter 2 in Friction Stir Welding and Processing, pp. 7-35, ASM International, Editors Rajiv S. Mishra & Murray W. Mahoney, 2007.
Metal-Matrix Composites (ASM Metals Handbook Online, ASM International, 2002), Introduction, Aluminum-Matrix Composites.
International Search Report and Written Opinion of International Application No. PCT/US2012/032793, Dec. 18, 2012.
Davis, Jr, editor, Handbook of Thermal Spray Technology, ASM International (2004), pp. 138-139.
International Preliminary Report on Patentability of International Application No. PCT/US2012/032793, Oct. 8, 2013, 7 pages.
Co-pending U.S. Appl. No. 14/163,253, filed Jan. 24, 2014.
Co-pending Application No. PCT/US12/32793 filed Apr. 9, 2012 (published as WO2013/002869 on Jan. 3, 2013).
Co-pending U.S. Appl. No. 14/159,105, filed Jan. 20, 2014.

* cited by examiner

Schematic of Continuous Feeding System.

Exemplary auger screws (not exhaustive).

Example of continous feed system with conical auger screw.

A Friction-Based Fabrication Process

Digital Manufacturing by Deposition of Successive Wrought Layers.

Schematic of continous feeding using a rolling mill type mechanism.

SYSTEM FOR CONTINUOUS FEEDING OF FILLER MATERIAL FOR FRICTION STIR WELDING, PROCESSING AND FABRICATION

CROSS-REFERENCE TO RELATED APPLICATIONS

This application is a Continuation-in-Part (CIP) application of U.S. application Ser. No. 12/792,655, filed on Jun. 2, 2010, which is a CIP of U.S. application Ser. No. 11/527,149, filed on Sep. 26, 2006, which claims priority to and the benefit of the filing date of U.S. Provisional Application No. 60/720,521, filed Sep. 26, 2005; and this application is a Continuation-in-Part (CIP) application of U.S. application Ser. No. 12/987,588, filed on Jan. 10, 2011, which claims priority to and the benefit of the filing date of U.S. Provisional Application No. 61/293,543, filed Jan. 8, 2010; and this application claims priority to U.S. Provisional Application No. 61/472,918, filed Apr. 7, 2011 and U.S. Provisional Application No. 61/473,221, filed Apr. 8, 2011, the disclosures of each of which is hereby incorporated by reference herein in their entireties.

STATEMENT OF GOVERNMENT INTEREST

This invention was supported by the U.S. Office of Naval Research under Contract No. N00014-05-1-0099. The U.S. Government has certain rights in this invention.

BACKGROUND OF THE INVENTION

1. Field of the Invention

The present invention relates to tools and methods for disposing, coating, repairing, or otherwise modifying the surface of a metal substrate using frictional heating and compressive/shear loading of a consumable metal against the substrate. More particularly, embodiments of the invention include friction-based fabrication tooling comprising a non-consumable member with a throat and a consumable member disposed in the throat, wherein consumable filler material is capable of being introduced to the throat in a continuous manner during deposition using frictional heating and compressive/shear loading of the filler material onto the substrate.

2. Description of Related Art

Conventional coating techniques, such as flame spray, high-velocity oxygen fuel (HVOF), detonation-gun (D-Gun), wire arc and plasma deposition, produce coatings that have considerable porosity, significant oxide content and discrete interfaces between the coating and substrate. Typically, these coating processes operate at relatively high temperatures and melt/oxidize the material as it is deposited onto the substrate. Such conventional techniques are not suitable for processing many types of substrates and coating materials, such as nanocrystalline materials due to the grain growth and loss of strength resulting from the relatively high processing temperatures.

An alternative deposition process available is referred to as cold spray type depositing. Such techniques typically involve a relatively low-temperature thermal spray process in which particles are accelerated through a supersonic nozzle. These techniques, however, may be relatively expensive and/or generally incapable of processing high aspect ratio particles, such as nanocrystalline aluminum powder produced by cryomilling. As a result, products prepared using cold spray techniques typically contain oxide impurities.

In light of these drawbacks, the inventors have developed new coating deposition techniques by having designed various friction-based fabrication tools capable of depositing coatings on substrates efficiently and in a simple manner. For example, the inventors have developed a tool comprising a non-consumable body and a throat defining a passageway lengthwise through the body, which are shaped to deliver a consumable material to a substrate and form a coating on the substrate using compressive loading and frictional heating. Such tools are capable of resulting in high quality adhesions between the substrate and coating and high strength products having an increased resistance to failure. In addition, the inventors have developed tools having internal tool geometry and means for exerting normal forces on the consumable during rotation to further enhance the tool's capability of delivering or depositing the feed material to or on the substrate.

The inventors have made further advancements in this field by reducing the effect of some of the mechanical challenges presented by feeding solid material into a spindle, including reducing down time of the machinery due to build up of consumable material within the spindle, improving efficiency of the deposition process by finding ways to continuously introduce consumable material to the tool, and by developing processes for introducing variations in the composition of the feed material during the deposition process for preparing functionally graded substrates in a simplified manner.

Such advancements in the coating field have made digital manufacturing by friction stir fabrication of specialty alloys a possibility. State-of-the-art digital manufacturing technologies for metal parts have evolved around powder metallurgy and fusion welding-based processes. Both of these processing methodologies yield parts with inferior mechanical and physical properties as compared to wrought metal of the same composition. Additionally, the production rates for even the fastest processes are relatively low (~40 lbs/hr for Ti) and the part envelopes are limited to a few cubic feet.

To address some of these particular manufacturing difficulties, the present inventors have proposed a novel high-speed, large-volume wrought metal deposition technology capable of enabling affordable, full-density, near net-shape component manufacturing from a wide range of alloys, including specialty high-strength steels and ultra fine-grained alloys. The ability to rapidly fabricate complex wrought alloy components from the ground up will provide a leap-ahead advancement in digital manufacturing and combat readiness.

SUMMARY OF THE INVENTION

Provided by embodiments of the invention is a highly scalable process for coating, joining direct digital manufacturing of wrought metal structures based on friction stir fabrication (FSF) processes. Using these state-of-the-art techniques it is possible to produce high-strength coatings, welds, and structures (strengths comparable to the base metal UTS), while retaining a wrought microstructure. The inventive structures exhibit superior qualities compared to structures having a solidification microstructure (i.e. cast microstructure). Benefits of the invention include the capability of creating substrates with little to no porosity, a typical undesirable result of parts prepared using molds.

Methods within the scope of the invention, and tools for performing such methods, include: depositing a coating on a substrate by way of frictional heating and compressive loading of a coating material against the substrate; continuously delivering the coating material through a stirring tool during frictional heating and compressive loading; and forming and shearing a surface of the coating on the substrate. The feed material or coating material can be fed through the spindle no-continuously, semi-continuously, or preferably continuously. Such methods and tools include use of tools comprising a surface facing the substrate for forming and shearing a surface of the coating, such as a shoulder.

Such methods can comprise depositing the coating material by spreading the coating material across the substrate by translating, relative to one another, a stirring tool and the substrate, wherein the stirring tool comprises a shoulder for trapping and shearing coating material below the shoulder. In embodiments, a coating material is deposited on a substrate using frictional heating and compressive loading of the coating material against the substrate. The coating material is a consumable material, meaning as frictional heating and compressive loading are applied during the process, the coating material is consumed from its original form and is applied to the substrate. For continuous-feed applications, it is preferred that the feed material be in the form of a powder or pellet. More particularly, as the applied load is increased, beyond what would be required to join the consumable coating material to the substrate, and the portion of the coating material adjacent to the substrate is caused to deform under the compressive load. In preferred embodiments, the deformed metal is then trapped below a rotating shoulder of the friction-based coating tool and then sheared across the substrate surface as the substrate translates and rotates relative to the tool.

Even further, the depositing can comprise pressing and translating the coating material against and across the substrate while rotating the coating material with a stirring tool which causes frictional heating of the coating material and substrate.

Preferred embodiments according to the invention include friction stir tools operably configured for applying a force or displacement to the filler material during deposition. Further preferred embodiments of methods, tools and systems of the invention include those in which the coating material is consumable and the stirring tool is non-consumable. For example, the coating material can be in powder form.

The stirring tool and coating material can be configured to rotate relative to the substrate. Rotation of the tool relative to the substrate can be in addition to translation of the tool relative to the substrate. Likewise, the stirring tool can have a throat and the coating material can be delivered through the throat of the stirring tool.

More specific embodiments of methods, systems, and tools according to the invention can include use a tool with a throat, where the coating material and throat are operably configured to provide for continuous feeding of the coating material through the throat of the stirring tool. In preferred embodiments, the consumable material is a powder, the throat of the tool is a hollow cylinder, and an auger shaped member disposed within the throat of the tool is used to force consumable powder material through the throat of the tool onto the substrate. The coating material can be delivered by pulling or pushing the coating material through the throat of the stirring tool.

Methods of the invention can comprise depositing coating material by plastically deforming and combining both a portion of the coating material and a portion of the substrate to form a coating on the substrate in a volume between the stirring tool and substrate and can comprise shearing of the surface of the coating by frictional heating and compressive loading of the coating while between the stirring tool and the substrate.

Preferred embodiments can comprise a friction stir tool comprising: a non-consumable body formed from material capable of resisting deformation when subject to frictional heating and compressive loading; a throat with an internal shape defining a passageway lengthwise through the non-consumable body; an auger disposed within the tool throat with means for rotating the auger at a different velocity than the tool and for pushing powdered coating material through the tool throat; whereby the non-consumable body is operably configured for imposing frictional heating and compressive loading of the consumable coating material against a substrate, and comprises a surface for trapping the consumable coating material in a volume between the non-consumable body and a substrate, and for forming and shearing a surface of the coating on the substrate.

Further preferred is a friction stir tool as described having a throat surface, which is a hollow cylinder disposed lengthwise through the tool body.

An embodiment of the present invention provides a friction-based fabrication tool comprising: a non-consumable body formed from material capable of resisting deformation when subject to frictional heating and compressive loading and a throat defining a passageway lengthwise through the body and comprising means for delivering a coating material through the throat of the tool throat.

Other specific embodiments include friction-based fabrication tools comprising: (a) a spindle member comprising a hollow interior for housing a coating material disposed therein prior to deposition on a substrate; (b) means for dispensing coating material through the throat of the tool; (c) means for compressive loading of the coating material from the spindle onto the substrate; and (d) means for rotating and translating the spindle relative to the substrate; wherein the spindle comprises a shoulder surface with a flat surface geometry or a surface geometry with structure for enhancing mechanical stirring of the loaded coating material, which shoulder surface is operably configured for trapping the loaded coating material in a volume between the shoulder and the substrate and for forming and shearing a surface of a coating on the substrate. In preferred embodiments, means for dispensing coating material through the throat of the tool is an auger shaped member disposed lengthwise in the throat and operably configured for pushing powdered coating material through the tool throat.

Further provided are tooling configurations comprising any configuration described in this application, or any configuration needed to implement a method according to the invention described herein, combined with a consumable coating material member. Thus, tooling embodiments of the invention include a non-consumable portion (resists deformation under heat and pressure) alone or together with a consumable coating material or consumable filler material (e.g., such consumable materials include those that would deform, melt, or plasticize under the amount of heat and pressure the non-consumable portion is exposed to).

Another aspect of the present invention is to provide a method of forming a surface layer on a substrate, such as repairing a marred surface, building up a surface to obtain a substrate with a different thickness, joining two or more substrates together, or filling holes in the surface of a substrate. Such methods can comprise depositing a coating material on the substrate with tooling described in this application, and optionally friction stirring the deposited coating material, e.g., including mechanical means for combining the deposited coating material with material of the substrate to form a more homogenous coating-substrate interface. Depositing and stirring can be performed simultaneously, or in sequence with or without a period of time in between. Depositing and stirring can also be performed with a single tool or separate tools, which are the same or different.

In embodiments, the tool and auger preferably rotate relative to the substrate. In further preferred embodiments, the tool and auger rotate relative to one another, i.e., there is a difference in rotational velocity between the auger and the tool body. There may be some relative rotation between the power coating material and the substrate, tool, or auger. The coating material and tool are preferably not attached to one another to allow for continuous or semi-continuous feeding or deposition of the coating material through the throat of the tool.

Especially preferred embodiments can include using various powder-type consumable materials or combinations during the deposition process to obtain a continuous compositional gradient in the filler material yielding a functionally graded coating on the substrate. Included in such embodiments are methods, tooling, and systems which make possible the fabrication of specialty substrates by digital manufacturing using friction stir fabrication-based techniques.

Embodiments of metal deposition methods according to the invention may significantly reduce labor and time requirements for preparing substrates having a desired composition. For example, the coating material to be deposited on the substrate may be delivered to the substrate surface using a "push" method, where a rotating-plunging tool, e.g., auger, pushes the filler material through the rotating tool, such as a spindle. Feed material can be introduced to the tool in various ways, including by providing an infinite amount of powder filler material into the tool body from a refillable container in operable communication with the tool.

In preferred embodiments, the filler material is a powdered solid and is fed through the tool body using an auger shaped plunging tool (e.g., a threaded member). In such an embodiment, the plunging tool may or may not be designed to move or "plunge" in a direction toward the substrate. For example, the threaded configuration of the auger itself is capable of providing sufficient force on the powdered feed material to direct the consumable toward the substrate for deposition, without needing vertical movement of the auger relative to the tool.

As the spindle and plunging tool rotate, compressive loading and frictional heating of the filler material can be performed by pressing the coating material into the substrate surface with the downward force (force toward substrate) and rotating speed of the plunging tool.

During the deposition process, it is preferred that the spindle rotate at a slightly slower rate than the auger or plunging tool. Alternatively, in embodiments, the spindle can also be caused to rotate faster than the auger. What is important is that there is relative rotation between the spindle and the auger during deposition of the coating material. Due to the difference in rotational velocities, the threaded portion of the auger provides means for pushing the consumable material through the tool body to force the material out of the tool toward the substrate. The threads impart a force on the feedstock that pushes the feed material toward the substrate much like a linear actuator or pneumatic cylinder or other mechanical force pushing on a surface of the feedstock. Even further, it may be desired in some applications to alter the rotational velocity of the tool body and/or auger during deposition of the coating material.

Deposition rate of the filler material on the substrate can be adjusted by varying parameters such as the difference in rotational velocity between the auger screw and the spindle, or modifying the pitch of the threads on the auger. If desired, for particular applications it may be warranted to control filler material temperature inside or outside of the tool body. Such thermally induced softening of the filler material provides means to increase deposition rates to meet application requirements.

While this process has been demonstrated on materials such as HY80 steel, the inventors have further expanded this approach to enable 3D part buildup. Fabrication of large parts in a timely manner can be accomplished with the continuous powder feeding mechanism. Multiple benefits and advantages can be realized from the inventive digital manufacturing technology as compared with other traditional methods. Table 1 shows some of these benefits.

TABLE 1

Comparison of various digital manufacturing technologies.

| | Friction Stir Fabrication | Laser Sintering/ Melting | Laser Deposition (LENS etc.) | E-Beam - Powder Bed | Ultrasonic Welding |
|---|---|---|---|---|---|
| Multi-material parts | x | | x | | x |
| Wrought microstructure | x | | | | x |
| Complex geometries | x | x | x | x | |
| Full density | x | | | | x |
| Layer-to-layer bond strength comparable to base metal UTS | x | | | | |
| Enables joining of parts | x | | x | | x |
| Wrought mechanical and physical properties | x | | | | x |
| Contamination prone | no | yes | yes | yes | no |

Provided by embodiments of the invention is the ability to combine complex-geometry-fabrication with multi-functional, multi-material layered composite structures with little or no discrete interface between layers. Additional capabilities include the ability to fabricate functionally graded structures by local compositional variation, controlling microstructure by locally varying processing conditions such as total heat input and applying specialized surface treatments and coatings.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

DETAILED DESCRIPTION OF VARIOUS EMBODIMENTS OF THE INVENTION

Figure 1:
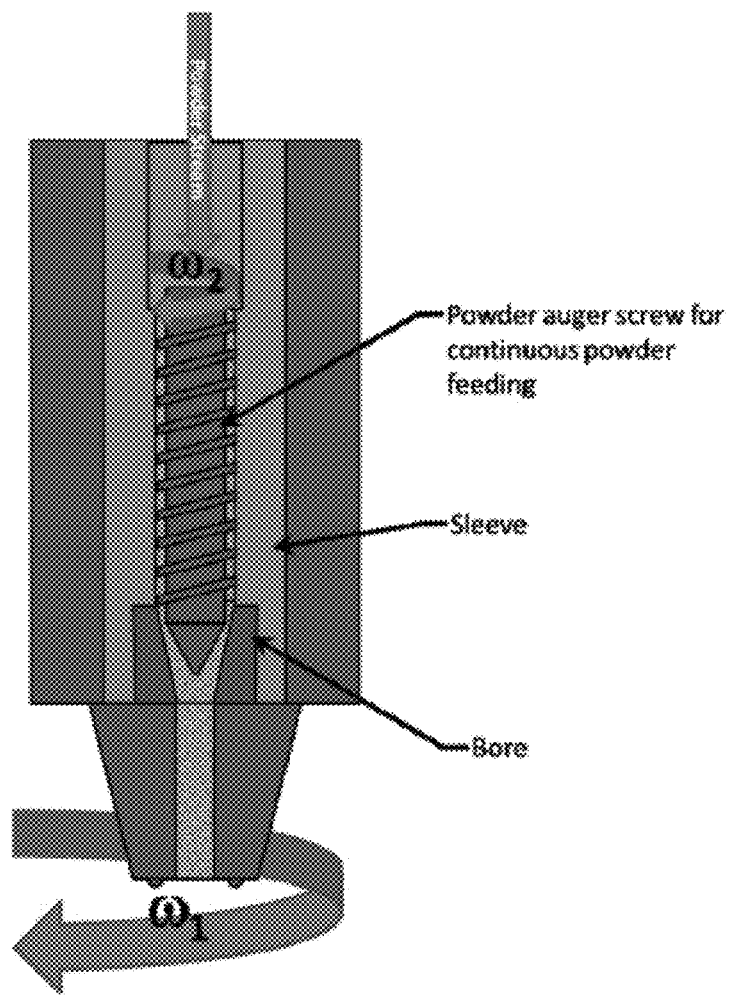
FIG. 1 is a schematic diagram illustrating a continuous feeding system of the invention.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Embodiments of the present invention provide a system to continuously feed powdered or granular materials through a friction stir fabrication or friction stir welding spindle. In the context of this specification, the terms "powdered," "granular," "pellet," "particle," and the like are intended to encompass a form in which the coating material can be provided as solid, loose particles. Each of these terms may be used interchangeably.

One challenge is that since the filler material is keyed into the spindle at the tool tip to ensure that the material is being rotated with the tool, it is preferred that the material fed into the spindle also be rotating at the same speed and aligned with the key orientation. For the filler material to be fed continuously into and through the tool body, a constant force or displacement should be applied to the filler material. In the context of this specification, the terms "filler material," "coating material," "consumable material," "feed material," and the like may be used interchangeably to refer to the material that is deposited on the substrate from the friction fabrication tooling. In an embodiment, a powder filler material is used in combination with an auger disposed in the tool throat for applying a constant displacement to the filler material within the throat.

The coating/filler material (for example, powder) can be fed through the rotating spindle where frictional heating occurs at the filler/substrate interface due to the rotational motion of the filler and the downward force applied. The mechanical shearing that occurs at the interface acts to disperse any oxides or boundary layers, resulting in a metallurgical bond between the substrate and coating. As the substrate moves (or with any relative motion between the substrate and tool), the coating can be extruded under the rotating shoulder of the tool. Typical translation speeds are approximately 1-3 inches per minute, however, with particular tool design and/or materials being used, it is possible that the translation speed could be increased to 10 inches per minute or faster.

According to embodiments, the present invention provides a friction-based fabrication tool comprising: a non-consumable body with a throat; a screw-type auger disposed in the throat for continuously delivering coating material through the throat of the tool body; one or more means for rotating the tool body at a desired first velocity and for rotating the auger at desired second velocity; and wherein the tool body comprises a surface for trapping coating material loaded on the substrate in a volume between the tool body and the substrate and for forming and shearing a surface of a coating on the substrate with frictional heating and shear loading. In preferred embodiments, such tooling can comprise a throat which is generally the shape of a hollow cylinder. Even further, the tooling can comprise a sleeve, which is a tubular member disposed within the tool throat and within which the auger is disposed.

Friction-based fabrication according to embodiments of the invention can involve depositing material onto a substrate and subsequently stirring the material into the substrate using friction stir processing to homogenize and refine the microstructure. Certain advantages of this solid-state process include, but are not limited to, the capability of depositing coatings, including nanocrystalline aluminum and/or metal matrix composites and the like, onto substrates such as aluminum at relatively low temperatures. The capability to deposit the substrates at such low temperatures allows for the ability to use a broader range of substrates, thereby being able to form improved friction stir tools for multiple applications.

In accordance with an embodiment of the present invention, the coating material may be deposited on the substrate at a temperature below a melting temperature of the coating material. The depositing (e.g., loading) of the coating material can be performed using one or more method steps for example described above. Loading of the coating material onto the substrate may be performed at a temperature ranging from about 100 to 500° C. or more below the melting point of the coating material. When the coating material comprises Al, the material may be deposited on a substrate at a temperature below about 500° C., typically below about 400° C. Once the coating material is initially loaded onto the substrate, any subsequent friction stirring of the coating material and/or substrate material may also preferably be performed below the melting temperature of the coating material. For example, when the coating material comprises Al, friction stirring temperatures may be maintained below about 500° C., typically below about 400° C. Furthermore, the friction stirring process (es) may be performed at a temperature below a melting temperature of the substrate.

Coatings produced using friction-based fabrication have other advantages, such as superior bond strength, density, and lower oxide content as compared to other coating technologies in use today. These friction-based fabrication processes may also be used to fill holes in various types of substrates, thereby making them stronger.

Embodiments provide for a tool comprising means for causing translational movement of the tool body relative to the substrate. Metallurgical bonding and/or homogenization and/or refinement of the microstructure between the substrate and coating can be achieved through rotation and/or translation or other relative movement between the tool and substrate. Such relative movement between substrate and tool, combined with means for compressing and retaining the coating material between the substrate and tool, can add additional frictional heating to the system. Likewise, the surface geometry of the tool can be modified to provide increased frictional processing of the materials, such as a tool with a shoulder and/or one or more pin-type projections, or a separate friction stir type tool. Frictional heating, compressive loading, and mechanical stirring are factors that can be adjusted to achieve a particular result.

Means for rotating the auger and tool body can be operably configured for rotation in the same direction or opposing directions. Preferably, the auger and tool body are rotated in the same direction, but at different speeds, so that there is relative rotation between them.

In preferred embodiments, the auger is operably configured for delivering coating material in powder form through the tool body.

Figure 5:
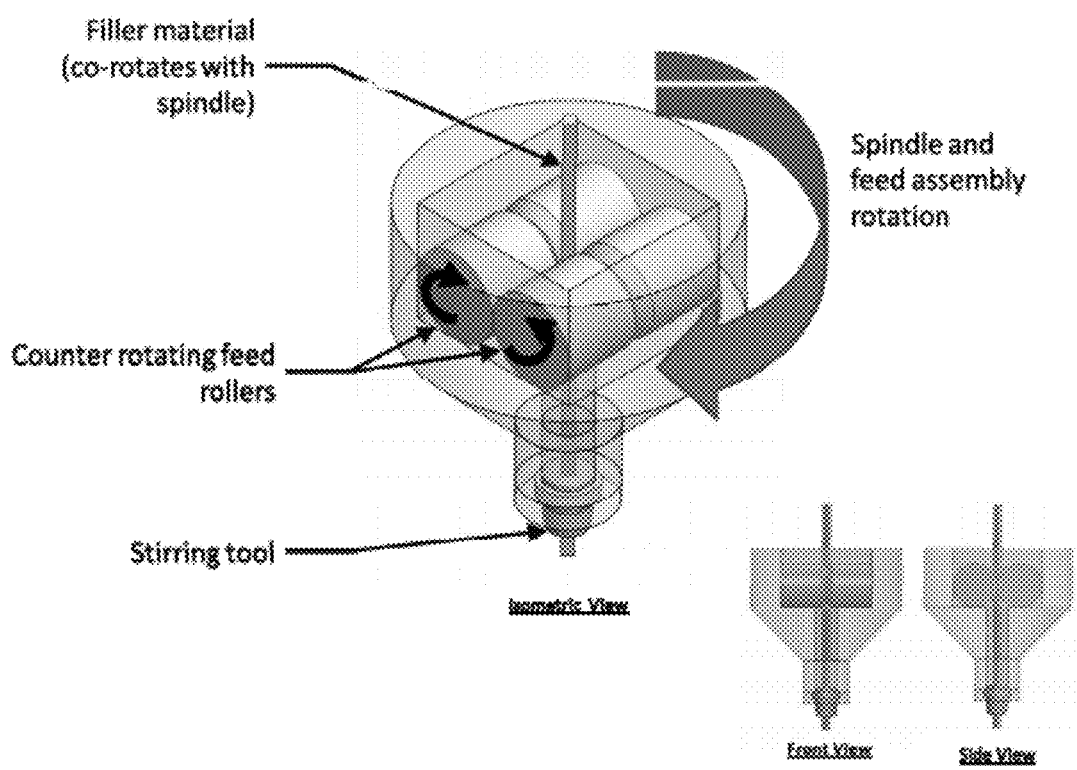
FIG. 5 is a schematic diagram of a continuous feeding system of the invention which uses a rolling mill type mechanism.

More specifically, to overcome the mechanical challenges of feeding solid material into the rotating keyed spindle, a mechanism as shown in FIG. 1 was conceived to feed powder into the spindle and force it out of the spindle while ensuring the filler is keyed into the spindle. This system utilizes an auger screw to force powder through the spindle at a defined rate, which is one means capable of accomplishing this purpose. Additional methods of feeding solid stock keyed into the orientation of the spindle and rotating at the exact rate of the spindle are conceivable. For example, force can be applied to the filler material using a metal rolling mill type mechanism which is rotating with the spindle, as shown in FIG. 5.

In such an embodiment, the spindle is spinning at a desired rotational velocity and the auger screw is driven at a different rotational speed in the same rotational direction which acts to force material out of the spindle. As shown in FIG. 1, the angular rotational speed or velocity of the friction stir tool is identified as $\omega 1$ and the angular rotational velocity of the auger is identified as $\omega 2$. In the context of this specification, the terms "rotational speed," "rotational velocity," "angular speed," and "angular velocity" can be used interchangeably and refer to the angular velocity of a component of the tool during use. The auger screw can rotate at a slower speed than the spindle, or in preferred embodiments the auger screw can rotate faster than the spindle. What is important is that there is relative rotation between the spindle and auger to cause filler material to be forced through the throat of the tool.

The pitch of the threaded auger screw and the volumetric pitch rate of the screw will affect the deposition rate under certain circumstances, and can be modified to accomplish particular goals. It is within the skill of the art to modify the pitch of the threads on the auger to obtain a certain desired result. The terms "tool," "friction stir tool," "spindle," "tool body," and the like as used in this specification may be used to refer to the outer portion of the tool body, which comprises a passageway lengthwise through the tool for holding and dispensing feed material through the tool. This passageway, or throat, is generally the shape of a hollow cylinder. The hollow cylinder can be configured to have a wider opening at the top of the tool for accommodating the auger and powder material and a smaller opening at the base of the tool where the feed material is dispensed from the tool. Thus, the shape of the throat of the tool need not be consistent throughout the length of the tool throat and can be configured to converge from one lengthwise end of the tool to the other. As shown in FIG. 1, the throat of the tool can comprise a first region which is the shape of a hollow cylinder of a first diameter. This region can transition into a second region which is the shape of a hollow cylinder of a second smaller diameter. The transition region can be a converging hollow cylinder or funnel shaped region to allow the first and second region to be connected seamlessly.

Disposed within the tool body is an auger. In the context of this specification, the terms "auger," "screw," and "plunger" may be used to refer to a component of the tool that is disposed within the tool throat for pushing or pulling material through the throat. Also within this specification, the auger can be considered a component of the friction stir tool body. The auger can have the general shape of a screw with threads, as shown in FIG. 1, or can be shaped in a spiral configuration similar to a spring. When disposed within the tool throat, there may be clearance between the auger and the inside surface of the tool throat to allow for the passage of feed material between the auger and the throat. In other embodiments, there is only enough space to allow for rotation of the auger without interference from the surface of the throat. Preferably, the auger and tool body or spindle are not attached to one another. Each is operably connected with means for rotating and translating the components relative to a substrate surface, such that the auger and tool can rotate at different speeds but translate relative to the substrate at the same speed. It is preferred to keep the auger disposed within the tool throat in a manner such that there is no relative translational movement between the auger and tool body.

Powdered materials can be feed into the top of the spindle using a fluidized powder delivery system. Any type of powder delivery system can be used in connection with the tools and systems of the present invention. For example, a gravity-fed powder feeder system can be used, such as a hopper. One such feed system is the Palmer P-Series Volumetric Powder Feeder from Palmer Manufacturing of Springfield Ohio, which is capable of delivering feed material from 0.1-140 cu. ft. per hour, and which comprises a flexible polyurethane hopper, stainless steel massaging paddles, 304 stainless steel feed tube and auger, 90-volt DC gearhead drive motor, flexible roller chain drive system, sealed drive train and cabinet, and solid state control and pushbutton controls. The feed system preferably comprises a reservoir for holding powder coating material, a mixer for mixing powder(s) added to the reservoir, and a passageway for delivering feed material from the hopper to the throat of the tool body. As feed material is dispensed into and from the tool, more feed material is delivered into the tool from the hopper. In this manner, the feed material is continuously or semi-continuously delivered. The gravity-fed dispensing systems allow for feed material to automatically be dispensed from the hopper to the friction stir tool during use as soon as material within the tool is dispensed.

Feeding multiple powders into the spindle will allow for creation of MMCs and alloys. MMC (metal-matrix composite) coatings can be formed in the same manner as a wrought coating, including by having the matrix alloy and the reinforcement feed through the spindle. However, the MMC consumable feed materials can be made by several methods, including but not limited to mixing the matrix metal and reinforcement powders as feed material, and in some cases mixing of the matrix and reinforcement further during the fabrication process.

In embodiments, a mix of powder types can be added to the hopper which is operably connected with the stir tool. Alternatively, several different types of powder can be added individually to the hopper, then mixed within the hopper and dispensed as a mixture to the friction stir tool during use. For example a metal powder and ceramic powder could be fed into the spindle at the same time, from the same or separate hoppers, and upon consolidation/deposition the coating would be a metal matrix composite (MMC). As used herein, the term "metal matrix composite" means a material having a continuous metallic phase having another discontinuous phase dispersed therein. The metal matrix may comprise a pure metal, metal alloy or intermetallic. The discontinuous phase may comprise a ceramic such as a carbide, boride, nitride and/or oxide. Some examples of discontinuous ceramic phases include SiC, $TiB_2$ and $Al_2O_3$. The discontinuous phase may also comprise an intermetallic such as various types of aluminides and the like. Titanium aluminides such as TiAl and nickel aluminides such as $Ni_3Al$ may be provided as the discontinuous phase. The metal matrix may typically comprise Al, Cu, Ni, Mg, Ti, Fe and the like.

Likewise, a first type of powder can be added to the hopper, dispensed through the tool, and applied to the surface of a substrate in a desired manner. Then, to produce a graded coating, a different type of powder can be added to the hopper, dispensed through the tool and applied to the substrate to provide a second layer of a different metal composition. This process can be repeated any number of times to form the graded coating by successive addition of any number of various material compositions.

Various types of substrates may be coated using the friction-based fabrication process of the present invention. For example, metal substrates comprising Al, Ni, Cu, Mg, Ti, Fe and the like may be coated. Furthermore, polymers and ceramics may be provided as the substrate. For example, the substrate may comprise a thermoplastic material.

Varying the ratio of the powder composition as a function of location will allow for deposition of coatings with graded compositions and properties. Functionally graded coatings are desirable when variations in mechanical and/or physical properties are desired as a function of position. Also grading the composition can be advantageous when joining dissimilar materials. It is within the skill of the art to provide desired mixtures of different types of powder materials to accomplish a specific type of coating.

For example, in embodiments aluminum powder is continuously feed into the spindle at a specified rate using a fluidized feeding system. The aluminum powder then comes into contact with the rotating auger screw which traps material in the open helical volume between the sleeve or bore inner diameter and the minor diameter of the helix. The rotation of the auger relative to the bore imparts a force on the powder which conveys the powder into the stirring tool, as shown in FIG. 1. The continuous conveyance of powder into the stirring tool by the auger forces powder through the stirring tool. The powder then exits the stirring tool and is consolidated and deposited as part of the filler material due to the shearing action and frictional heating imparted by the stirring tool.

The tool body and auger can be operably configured in multiple ways to achieve the functional results described in this specification. Below are some of the features and their related design tasks which can be incorporated into the spindle.

Auger Screw Design—

Figure 2A:
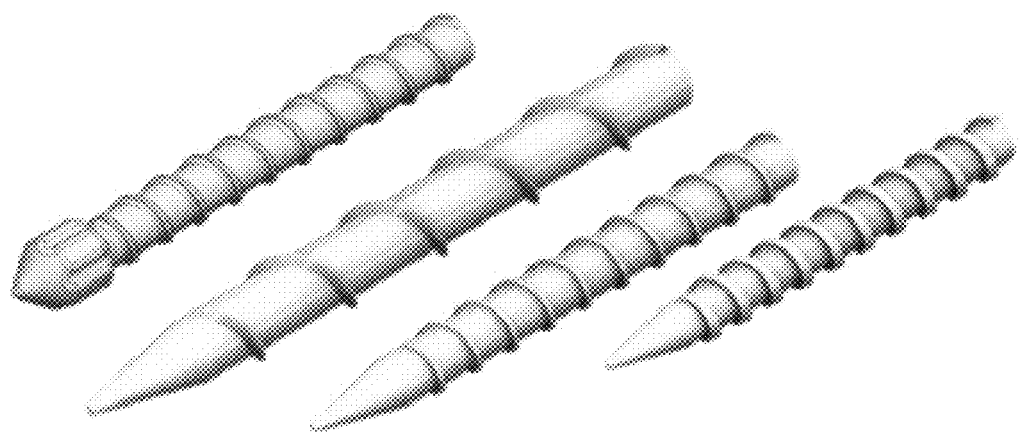
FIG. 2A is a schematic diagram illustrating exemplary auger screws of the invention.

For material to be forced through the spindle the auger screw should be designed in such a way that pressure is exerted on the powder by the screw. A significant amount of design knowledge exists in the metal powder injection molding and extrusion literature. Polymer screw designs, e.g., can be found at: http://www.spirex.com/media/doc/The %20Basics%20of%20Good%20Extrusion%20Screw%20Design.pdf, which is hereby incorporated by reference herein in its entirety, and can include screw designs such as the Xaloy brand extrusion screw, including the Efficient Screw or the Fusion Screw for example. Even further, for example, non-limiting auger screw designs can include those shown in FIG. 2A. In embodiments, a twin screw design can also be used where two screws cooperate together to push the feeder material through the tool throat. The design features of particular interest are the amount of pressure generated on the powder at the tool throat and the rate at which powder is fed from the screw (e.g., auger) per revolution or the volumetric pitch. The absolute rate at which powder is fed through the spindle will depend on the volumetric pitch and the difference between the rotational velocities of the spindle and auger screw.

Figure 2B:
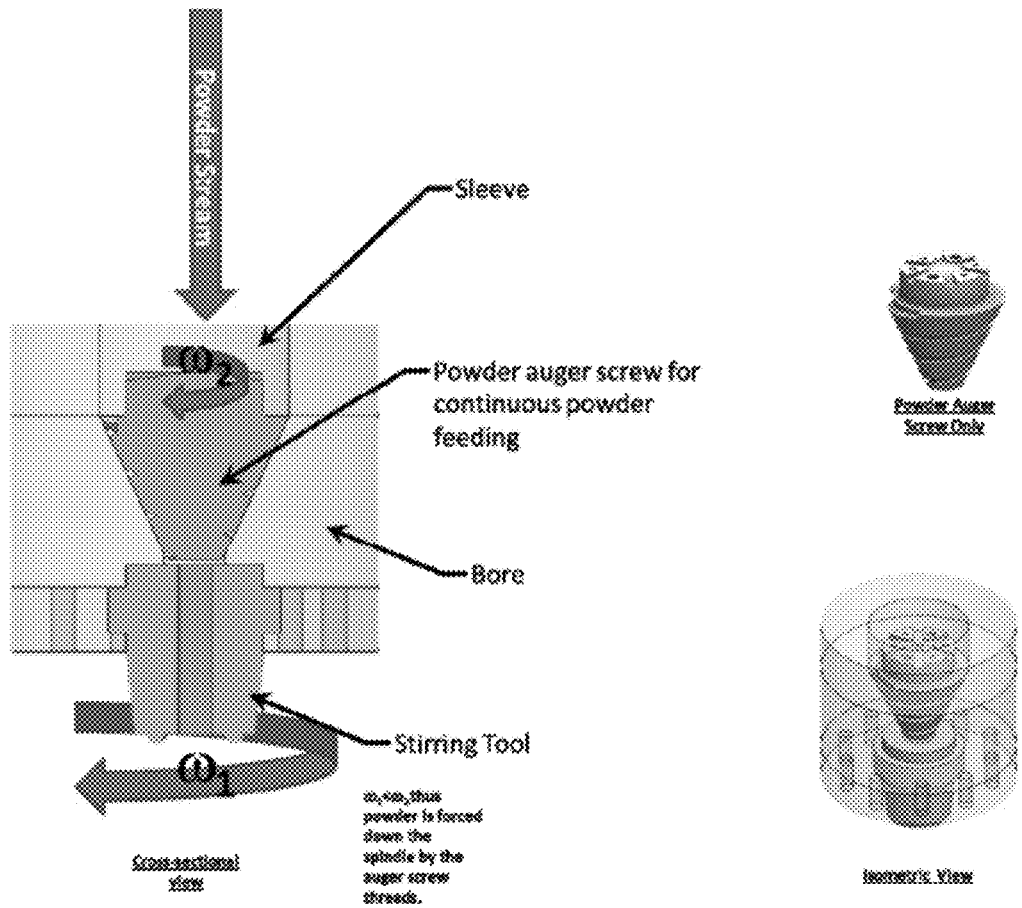
FIG. 2B is a schematic diagram illustrating a continuous feed system according to embodiments of the invention using a conical auger screw.

As shown in FIG. 2B, a conical auger screw can also be used to push feed material through the throat of the stirring tool in a continuous or semi-continuous manner. Powder feed material can be delivered into the interior conical portion of the powder auger screw preferably through one or more inlets disposed on the upper portion of the auger screw. Due to the conical design, the powder is pushed into the stirring tool disposed below the auger.

Sleeve Design—

The powder feeding system can comprise an auger screw and housing or bore, preferably modular components, capable of insertion into the throat of the spindle. Both the screw and bore will likely wear with use and need to be replaced periodically and as such it may be desired that they not be permanently joined to the spindle. One embodiment provides for the screw and bore to be mounted into a sleeve that will be keyed into the spindle and fastened into place. During use, the powder feed material can be dispensed into the bore within which the auger is disposed. Feed material is then pushed through the bore to be dispensed on the substrate without coming into contact with the throat of the tool body.

The sleeve, as shown in FIG. 1, occupies the volume between the spindle inner diameter and the auger screw and may also be keyed into the spindle and/or stirring tool. The sleeve provided mounting locations for support bearing for the auger screw as well as a mounting location for the bore. The bore is in contact with some or all of the auger major diameter. The bore can be a comprised of a different more wear resistant material than the sleeve as rubbing of the auger and feed powder wears the bore.

Bore Design—

The bore can be operably configured to accommodate bearings on one or both the powder feed side and spindle to keep the screw from whipping or becoming off-center. Proper selection of these bearings and the manner in which they are housed will be a key to the long term success of the material feeding design.

Powder Feeding/Metering System—

Powder filler material can be fed into the top of the rotating spindle by a fluidized powder dispensing system which can continuously and accurately dispense powder. In preferred embodiments, two or more separate dispensing systems can be installed so that multiple powders can be independently introduced to the system allowing for continuous variation of composition. Employing a fluidized feeding will allow for feeding powders of widely different particle sizes and shapes.

Continuous powder feeding makes the possibility of fabricating large complex 3D structures practical. The inventive approach is differentiated from all other digital manufacturing technologies in that it enables solid-state deposition of wrought metal onto a substrate followed by successive build-up of complex 3D structures. Unlike state-of-the-art digital manufacturing, the approach described in this application is based on wrought metal working technology which affords high deposition rates (200 lbs/hr in steel) and a large part envelope (multiple cubic meters), which are not offered by modified powder metallurgy or fusion welding methods.

Digital manufacturing using friction-based fabrication tooling according to embodiments of the invention can include automated systems, such as computer aided design (CAD), e.g., comprising: a) tooling and a fluidized powder delivery system in operable communication with the tooling; b) means for controlling (i.e., control system) one or more functions of the tooling and/or powder delivery system (such as rotational velocity of the tool body, rotational velocity of the auger, translational velocity of the tool, composition and flow rate of the powder into the tooling and/or three-dimensional positioning of the tooling relative to the substrate); c) software for providing instructions (whether previously programmed or comprising the capability to deliver real-time instructions) to the control system for the tooling regarding, e.g., rotational and/or translational speed, three-dimensional positioning of the tooling relative to the substrate, and/or composition and/or flow rate of the powder. The tooling for such designs can include any friction stir tooling available.

Embodiments of the invention provide a friction stir system comprising: friction stir-based fabrication tooling; and a fluidized powder delivery system in operable communication therewith; wherein the powder delivery system is operably configured for continuously delivering a coating material into and through the tooling.

Specific embodiments of systems according to the invention include a friction stir-based fabrication tooling comprising: a non-consumable body with a throat; a screw-type auger disposed in the throat for continuously delivering powder-type coating material through the throat of the tool body; one or more means for rotating the tool body at a desired first velocity and for rotating the auger at desired second velocity; and a shoulder for trapping and shearing a surface of coating material loaded on the substrate in a volume between the tool body and the substrate. Such systems can comprise means for automatically dispensing varying amounts of filler material into the tooling in response to variations in thickness of a substrate being processed. For example, as feed material is delivered through the tool body, more feed material is automatically delivered into the tool body from a reservoir, e.g., hopper. As the tool translates over the substrate surface, variations in substrate thickness may be encountered by the tool, such as the substrate being thinner in one portion. As the tool is depositing filler material to the thinner portion of the substrate, more filler material will be needed to fill the space between the substrate surface and the shoulder of the tool. A gauge can be used to determine when the substrate thickness is different and thus requires an accommodating amount of filler material. More particularly, systems of the invention can comprise a thickness gauge for determining substrate thickness and a control system for varying the amount of filler material dispensed in response to detection of a pressure above or below a set pressure threshold. Even further, such systems can comprise means for translating the tooling relative to a substrate in a desired CAD-driven configuration.

Figure 3A:
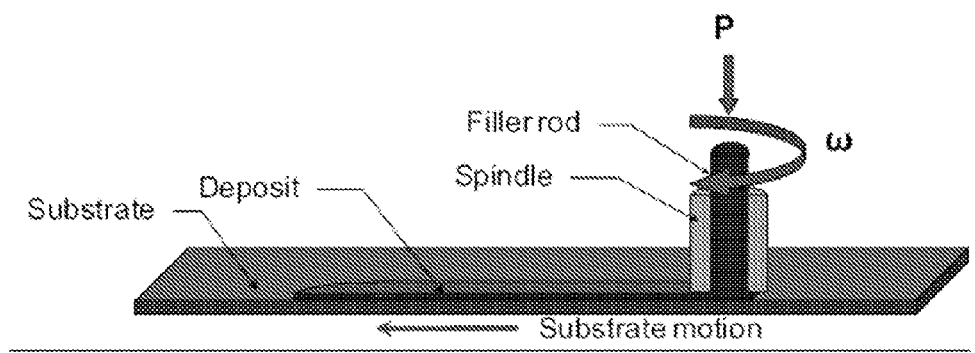
FIGS. 3A-B are schematic diagrams showing a friction-based fabrication process of the invention.
Figure 3B:
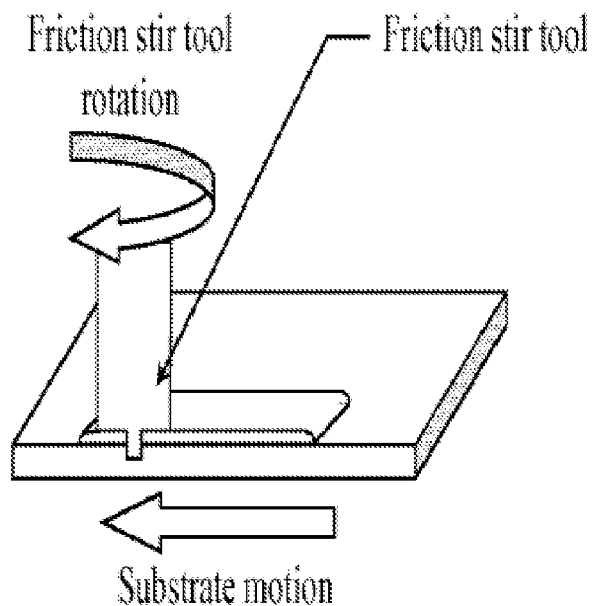

Especially preferred tooling includes tools which have an internal throat for delivering feed material through the tool for deposition on a substrate and which have structure for forming and shearing a surface of the coating material deposited on the substrate, such as a shoulder facing the substrate. Representative friction stir tools that can be used according to embodiments of the invention are shown in FIGS. 3A-B. As shown, filler material, such as in rod or powder form, can be delivered through the throat of the tool with a plunger tool for pushing the material toward the substrate. The plunger tool in preferred embodiments can be in the form of an auger. As the body of the tool, or spindle, is rotated, the consumable feed material is dispensed on the surface of the substrate and the tool is translated across the surface of the substrate to deposit a layer of feed material as a coating on the substrate.

Methods, tools, and systems of the invention provide for freeform manufacturing of 3-D parts having a wrought microstructure. In embodiments, friction-based fabrication may be a solid state, friction-based coating method that can be used, for example, to meet naval needs for welding, coating and repair of aluminum vessels. Friction-based fabrication according to the invention uses shear-induced interfacial heating and plastic deformation to deposit wrought metal and/or metal matrix composite (MMC) coatings on substrates. The additive-type fabrication processes of embodiments of the invention is suitable for direct manufacturing of parts by computer assisted design (CAD) techniques, otherwise referred to as digital manufacturing. Methods, tooling, and systems of the present invention are capable of providing metal substrates comprising a digitally manufactured functionally graded coating exhibiting a layered wrought microstructure with no discrete interface between layers.

Specific methods of the invention include friction-based fabrication methods comprising: providing an amount of coating material in powder form; delivering the coating material into a throat of a friction stir tool; pushing the coating material through the tool using an auger; dispensing the coating material onto a substrate; and forming and shearing a surface of the coating material on the substrate using compressive loading and frictional heating. The coating material can be delivered into the throat of the tool from a hopper and by gravity in response to coating material exiting the tool.

Once the coating has been deposited onto the surface of the substrate, e.g., using the solid-state friction deposition method, it may then be friction stir processed to adhere the coating to the surface of the substrate and refine the coating microstructure. The goal of the friction stir process is to produce a homogenous coating with a bond strength approaching the ultimate tensile strength of the base alloy. For example, friction stir processing of an Al—SiC rib was performed using a stifling tool with an unthreaded cylindrical pin. The use of this stifling tool resulted in some variation in the local SiC volume fraction and a channel at the bottom of the FSP zone. The quality of the friction stirred regions of the substrates may be optimized, including eliminating any channel present along the length of the friction stir path. Elimination of the channel may be achieved by using a friction stir tool with a threaded pin. Subsequent processing of the same MMC coating and 5083 Al substrate with such improved tool geometry produced homogeneous coatings without a channel. By modifying the stifling tool geometry, coated substrates may be produced without channels through the use of a threaded-tapered stirring tool.

Methods of the invention can further comprise altering powder composition during deposition to provide a coating with a desired composition gradation.

In embodiments, a method of preparing a metal part is provided which comprises depositing multiple layers of coating material on a substrate in a selected three-dimensional configuration using continuous powder-fed friction fabrication tooling. In such methods, during depositing, the powder composition can be selectively modified to obtain gradations in the 3D configuration with no discrete interface between coating layers to prepare a functionally graded metal part. Functionally graded substrates formed using any of the tools, methods, or systems of the present invention are also provided.

Figure 4:
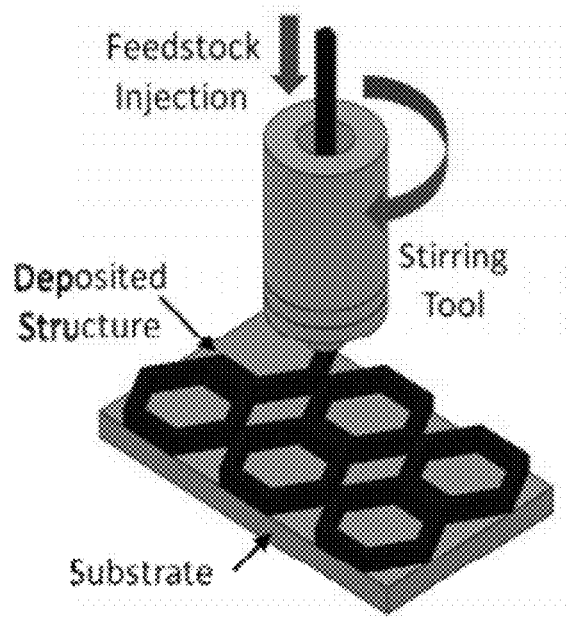
FIG. 4 is a schematic diagram of a digital manufacturing method of the invention.

FIG. 4 provides a schematic diagram of tooling, systems, and methods for preparing functionally graded substrates. As shown in FIG. 4, 3-D digital manufacturing by deposition of successive wrought layers is made possible by embodiments of the present invention. As shown, feed material can be continuously or semi-continuously dispensed onto a substrate through the throat of a friction stir tool according to a desired CAD configuration. Material is added to the substrate using any friction fabrication tool, but especially preferred is tooling capable of delivering consumable feed material through the throat of the tool. Using feed material in powder form, the feed material can be of one or a mixture of types of material that is added to a feed delivery system and continuously feed into and through the tool throat. In embodiments where an auger is used to push feed material through the spindle, the feed material can be contained within a bore in which the auger is disposed within the tool body. In this manner, the feed material comes into contact with the auger but not the interior surface of the tool body. The auger is rotated within the tool throat to push the feed material through the tool body and onto the substrate in the desired CAD pattern. The tool is also preferably rotated and comprises a shoulder to trap filler material between the tool body and the substrate, under which a surface of the coating is formed and finished by shearing action from the tool body. As the tool is translated across the substrate in the desired CAD pattern, a coating is formed on the substrate in the desired pattern. As shown, the tool need not translate in a straight line and can translate relative to the substrate in any pattern, preferably according to the CAD program.

FIG. 5 is a schematic drawing illustrating another embodiment of the continuous feed system of the invention, which uses a rolling mill type mechanism to deliver feed material into the spindle. As shown, a rod-type filler material can be fed into the throat of the stirring tool using counter-rotating feed rollers. Preferably, the filler material rod co-rotates with the stirring tool. In embodiments, and as shown in FIG. 5, the rod filler material has a square cross section and cooperates with the interior of the stirring tool, which has a square cross section about the same size or just slightly larger than the rod filler material in order to accommodate the filler material in the throat of the tool. During use, due to the shape of the filler material and corresponding shape of the interior of the tool, normal forces act on the filler material to cause the filler material to rotate with the stirring tool. The feed material is disposed between two feed rollers which rotate toward one another causing the filler material to be pulled into the space between the rollers and toward the stirring tool. As the feed rollers rotate, the feed material is continuously provided into the throat of the tool.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. Where a range of values is provided in this specification, each value between the upper and lower limits of that range is also specifically disclosed. The upper and lower limits of these smaller ranges may independently be included or excluded in the range as well. As used in this specification, the singular forms "a," "an," and "the" include plural referents unless the context clearly dictates otherwise. It is intended that the specification and examples be considered as exemplary in nature and that variations that do not depart from the essence of the invention are intended to be within the scope of the invention. Further, the references cited in this disclosure are incorporated by reference herein in their entireties.

The invention claimed is:

1. A friction-based fabrication tool comprising:
   a non-consumable body with a throat;
   a screw-type auger disposed in the throat for continuously delivering solid coating material through the throat of the tool body;
   wherein the friction-based fabrication tool is operably configured for rotating the non-consumable tool body at a desired first velocity and for rotating the screw-type auger at a desired second velocity;
   wherein the non-consumable tool body comprises a surface for trapping coating material loaded on a substrate in a volume between the non-consumable tool body and the substrate and for forming and shearing a surface of a coating on the substrate with frictional heating and shear loading;
   wherein the screw-type auger comprises threads and a shaft, and wherein the threads extend from the shaft a distance of less than a radius of the shaft; and
   wherein the non-consumable body has no pin configured to rotate on an axis of rotation of the non-consumable body.

2. The tool of claim 1, wherein the tool throat is a hollow cylinder.

3. The tool of claim 1 comprising a sleeve, which is a tubular member disposed within the throat and within which the screw-type auger is disposed.

4. The tool of claim 1, wherein the non-consumable tool body is capable of translational movement relative to the substrate.

5. The tool of claim 1, wherein the non-consumable tool body comprises a shoulder.

6. The tool of claim 5, wherein the shoulder has a flat surface geometry.

7. The tool of claim 5, wherein the shoulder has a geometry with structure for enhancing mechanical stirring of the loaded coating material.

8. The tool of claim 1, wherein the friction-based fabrication tool is operably configured for rotating the screw-type auger and the non-consumable tool body in the same direction.

9. The tool of claim 1, wherein the screw-type auger is operably configured for delivering coating material in powder form through the non-consumable tool body.

10. The tool of claim 1, wherein the threads extend from the shaft a distance of less than half of a radius of the shaft.

11. A friction stir system comprising:
    friction stir-based fabrication tooling comprising a non-consumable body with a throat; and
    a screw-type auger disposed in the throat for delivering solid coating material through the throat of the tool body, wherein the screw-type auger has threads and a shaft and the threads extend from the shaft a distance of less than a radius of the shaft; and
    a fluidized powder delivery system in operable communication therewith;
    wherein the fluidized powder delivery system is operably configured for continuously delivering a coating material into and through the friction stir-based fabrication tooling and wherein the non-consumable body has no pin configured to rotate on an axis of rotation of the non-consumable body.

12. The system of claim 11, wherein the friction stir-based fabrication tooling further comprises:
    a shoulder for trapping and shearing a surface of coating material loaded on a substrate in a volume between the friction stir-based fabrication tooling and the substrate;
    wherein the screw-type auger is disposed in the throat for continuously delivering powder-type coating material through the throat of the tool body; and
    wherein the friction-based fabrication tool is operably configured for rotating the friction stir-based fabrication tooling at a desired first velocity and for rotating the screw-type auger at desired second velocity.

13. The system of claim 11, operably configured for automatically dispensing varying amounts of filler material into the friction stir-based fabrication tooling in response to variations in thickness of a substrate being processed.

14. The system of claim 13, comprising a thickness gauge for determining substrate thickness and a control system for varying the amounts of filler material dispensed in response to detection of a pressure above or below a set pressure threshold.

15. The system of claim 11, wherein the friction stir-based fabrication tooling is capable of translating relative to a substrate in a desired CAD-driven configuration.

16. The system of claim 11, wherein the threads extend from the shaft a distance of less than half of a radius of the shaft.

17. The tool of claim 11, wherein the non-consumable body comprises a shoulder with a flat surface geometry.

18. The tool of claim 11, wherein the non-consumable body comprises a shoulder with a geometry with structure for enhancing mechanical stirring of the loaded coating material.

* * * * *